June 14, 1938.   G. E. TROXELL   2,120,381
MATERIALS TESTING APPARATUS
Filed Oct. 9, 1935    2 Sheets-Sheet 1
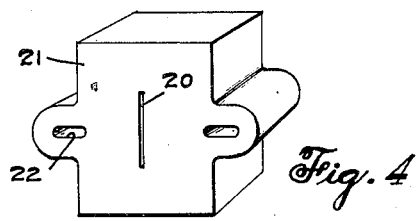
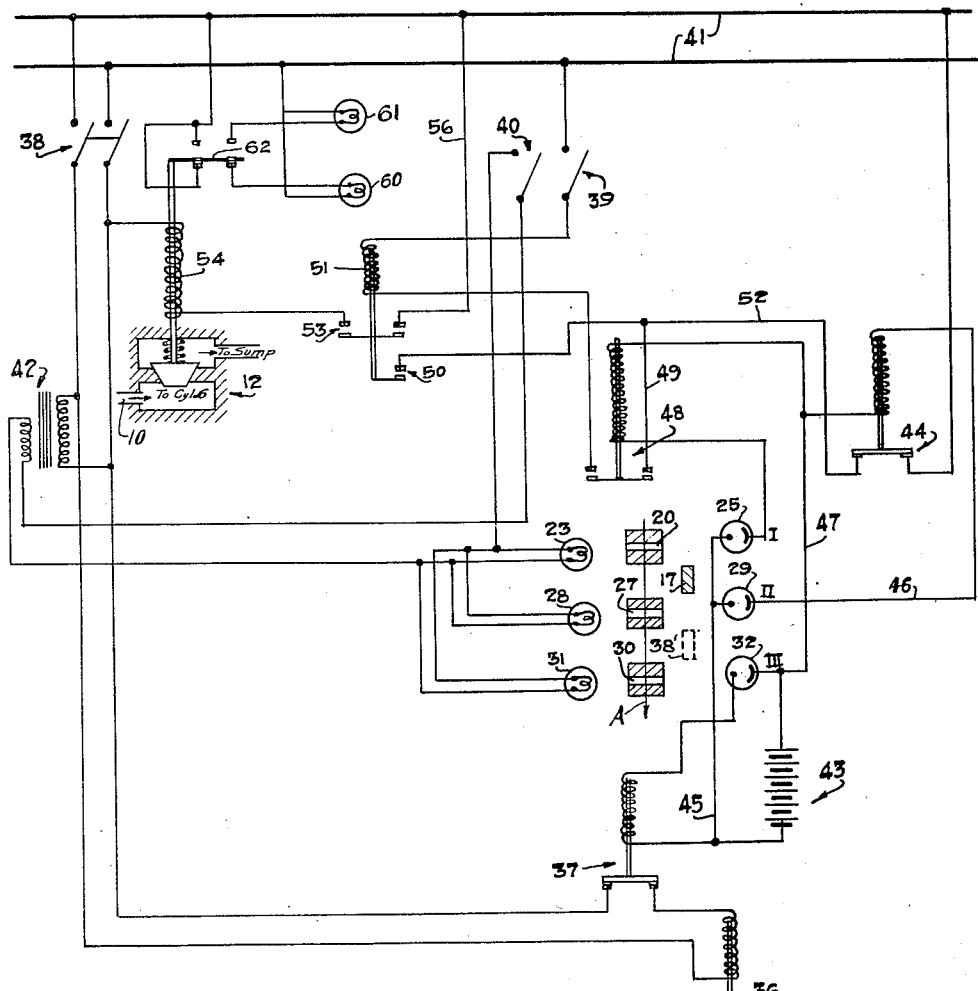
INVENTOR
G. E. Troxell
BY
ATTORNEY June 14, 1938.   G. E. TROXELL   2,120,381
MATERIALS TESTING APPARATUS
Filed Oct. 9, 1935   2 Sheets-Sheet 2

INVENTOR
G. E. Troxell
BY
ATTORNEY

Patented June 14, 1938

2,120,381

UNITED STATES PATENT OFFICE 2,120,381

MATERIALS TESTING APPARATUS

George E. Troxell, Berkeley, Calif., assignor to Baldwin-Southwark Corporation, a corporation of Delaware Application October 9, 1935, Serial No. 44,233

7 Claims. (Cl. 265—14)

This invention relates generally to an improved apparatus for controlling or regulating pressure or load or for controlling the application of power to a movable member which may serve various purposes, one of which as specifically shown herein is to load a specimen in a materials testing machine although certain principles and features of the invention are broadly applicable to various devices which may be either foreign or auxiliary to materials testing machines and in which pressure or load is broadly a factor.

It is one object of my invention to provide an improved sensitive apparatus for effectively controlling or regulating pressure, load or the application of power to a power driven movable member. In one specific aspect of the invention I have applied one form of the apparatus to the control of a materials testing machine so as to maintain a substantially constant load on a specimen and maintain such load within relatively narrow limits at any selected value of the load range or to change the load at any desired rate. It will be understood that precision qualities and sensitiveness are vital to apparatus of any kind which involves means responsive to the load of a specimen and that it is always desirable that the initial load responsive elements of such apparatus shall be as free as possible from friction or restraint. Any inaccuracies that may be present in the initial load responsive elements will be immediately reflected in a very much magnified manner in the power movable member which it is desired to control. Hence it is a further specific object of my invention to accomplish this initial load responsiveness with a great deal of sensitivity and accuracy and to precisely control a larger source of power.

In a hydraulic materials testing machine a source of hydraulic power is supplied to a load producing cylinder and ram for stressing a specimen. Due to leakage between the ram and cylinder or other possible causes, considerable difficulty may be experienced in maintaining constant load on the specimen especially for an appreciable period of time.

In one specific application of my invention as herein disclosed I employ a hydraulically operated load responsive member, such as an indicating hand. The load responsive fluid may be taken either directly from the ram cylinder of a hydraulic type machine, or in the case of the Emery type materials testing machine the fluid may be taken from an independent weighing system which is a characteristic of the Emery type machine, or in the case of mechanically operated machines the load responsive hand or member may be suitably connected to the counterpoise screw or connected to the weighing pendulum in the case of a hydraulic pendulum machine. However, in any of these cases it will be seen that a member is provided responsive to the load on a specimen. I then place in effective cooperative relation to such a load responsive member, light sources and photoelectric cells arranged to control application of power to a movable member which for purposes of illustration herein is a ram of a materials testing machine but which might be a movable power driven member of any auxiliary apparatus used in connection with a materials testing machine and necessitating that the application of power be controlled in accordance with specimen load.

Other objects and advantages will be more apparent to those skilled in the art from the following description of the accompanying drawings in which:

Fig. 1 is a diagram of the circuits and control elements in my improved combination;

Fig. 4 is an enlarged perspective of one of the light slots;

Figure 3:
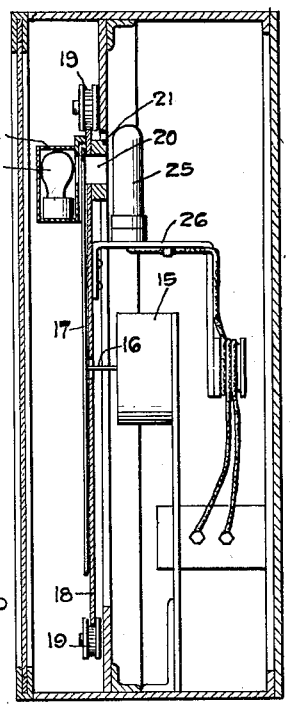
Fig. 3 is a substantially vertical section taken on the line 3—3 of Fig. 2.
Figure 5:
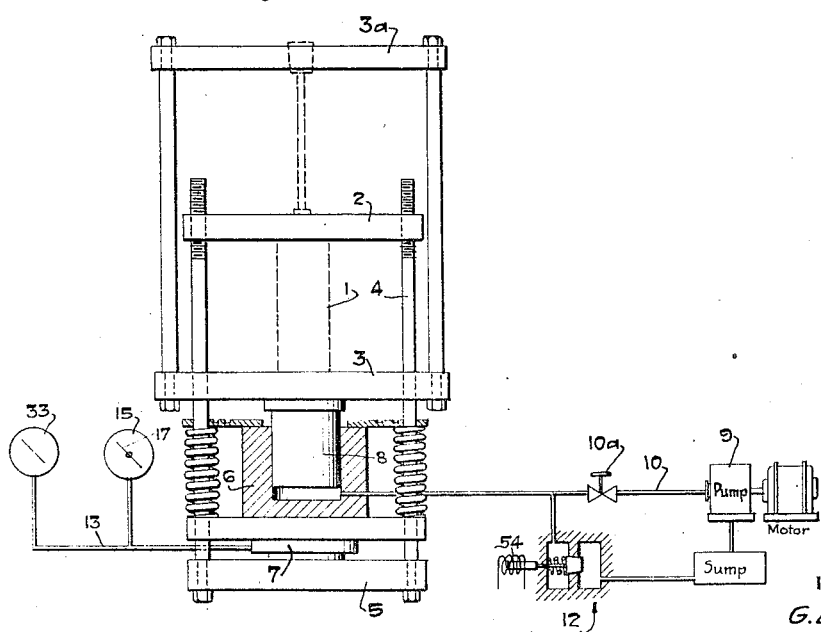
Fig. 5 is a diagrammatic outline of a materials testing machine to which my invention is applied for purposes of illustration.

The particular embodiment of the invention as shown herein is merely for the purpose of illustrating certain principles of the invention together with its application to one type and form of apparatus among possible others. To this end, I have disclosed in Fig. 5 a diagrammatic outline of an Emery type materials testing machine wherein a specimen 1 is suitably supported for a compression test between a crosshead 2 and platen 3. Crosshead 2 is part of a sensitive weighing frame including tension rods 4 and a lower crosshead 5. Interposed between this lower crosshead and a ram-cylinder 6 is a hydraulic weighing support 7 which may be of the general type shown in Emery Patent No. 1,848,468. A movable power driven member or means of any suitable form is shown specifically herein for purposes of illustration as a ram 8. This power driven means is arranged to move platen 3 upwardly to impose a compression load on the specimen, whereas in a tension test the specimen is supported by suitable grips between crosshead 2 and an upper loading crosshead 3a. A motor-driven pump 9 preferably of the adjustable Hele-Shaw type supplies pressure fluid power to cylinder 6 through a pipe 10. Suitable means, provided for establishing the degree of available power, is specifically shown as a manually adjustable discharge valve 10a although the Hele-Shaw pump can also be adjusted to determine the available power. Mechanism for controlling the application of power to the movable member is specifically shown herein as comprising a spring closed relief valve 12 adapted to by-pass fluid from pipe 10 to a pump sump. Hence by suitably controlling the said power through operation of said control mechanism, it is possible to control movement of member 8 and specifically to maintain a predetermined load on a specimen. The load on the specimen is transmitted through the sensitive frame of the machine to the hydraulic support 7 in which fluid pressure proportional to the load is created and transmitted through a pipe 13 to a Bourdon tube generally indicated at 15 in Fig. 3. The Bourdon tube as shown in Fig. 3 rotates a shaft 16 and a double end hand 17, the tube and hand broadly constituting means responsive to the load on the specimen.

Hand 17 is placed in front of an opaque disc 18 which is preferably supported at its circular edge by a series of rollers 19 to permit angular adjustment about the axis of shaft 16. A light slot 20 is formed at one portion of disc 18. To insure a relatively narrow beam of light through said slot together with circumferential or angular adjustment thereof, there is provided a relatively thick light ray guide 21 having, as shown in Fig. 4, circumferentially elongated holes 22 to receive screws adapted for threaded engagement with disc 18. The elongated holes 22 permit angular adjustment of the light slot to assist in establishing one limit within which load is maintained. The load responsive hand 17 is of sufficient width as to be able to cover slot 20 and thus intercept light from a suitable source such as an incandescent bulb 23 supported in alignment with light slot 20. Bulb 23 is enclosed within a suitable opaque casing 24 which is secured in any suitable manner to the front of disc 18 so as to move therewith during adjustment thereof. A bracket 26, for supporting a photoelectric cell 25 in alignment with the light slot, is secured to the rear of disc 18. Thus it is seen that the photoelectric cell 25, light ray slot 20, source of light 23 and disc 18 will always be maintained in fixed relation with respect to each other so as to be adjustable as a unit.

There is also provided another light ray guide 27, source of light 28 and photoelectric cell 29 to establish the other load limit. The two slots 20 and 27 are very nearly on the same diametral line, the actual offset from the diameter being adjustable due to elongated screw holes 22. For safety purposes, a guide 30, a light source 31 and a photoelectric cell 32 are substantially offset from the slot 27. It will be understood that the construction and arrangement of all of the foregoing light sources, light guides and photoelectric cells have the same unitary relation to disc 18 and are identical to the specific construction described in connection with light 23, guide 21 and photoelectric cell 25 together with the supporting structure therefor so that the whole is adjustable as a unit.

In describing the mode of operation of the circuits and apparatus as used in controlling a materials testing machine in response to load on a specimen for the purpose of maintaining a constant load thereon, the low, high and safety limit light control units are respectively indicated by the numerals I, II and III. To load the specimen, pump 9 is started by closure of a switch 35 in a pump motor circuit, the contacts of a solenoid switch 36 in this circuit being normally closed. In the circuit of said solenoid the contacts of a solenoid switch 37 are normally closed but said circuit is open by virtue of a line switch 38 being open thus permitting solenoid switch 36 to be closed and cause operation of pump 9 which thereupon supplies pressure fluid to ram cylinder 6. During this time by-pass valve 12 is closed so that by adjusting the degree of opening of valve 10a or by adjusting the stroke of pump 9, sufficient fluid is pumped to load the specimen. When the desired load is reached, then valve 10a is adjusted to reduce flow therethrough to the point where it just maintains a constant load on the specimen. The specimen load is indicated on the usual load indicating dial 33 which, as shown in said Emery patent, has its own Bourdon tube and connection to the hydraulic support. This Bourdon tube is separate from tube 15 and hand 17. During the foregoing loading period, Bourdon tube 15 and hand 17 will have moved in accordance with the load. When the desired load is reached, the disc 18 of the load maintainer apparatus is rotated manually in a clockwise direction (Fig. 2) through any suitable means such as a hand wheel 34, a shaft 35 and a bevel gear 36. Gear 36 drives one of rollers 19 which is preferably a gear meshing with peripheral gear teeth on disc 18 to rotate the same. The rotation of disc 18 is continued until one end of hand 17 of the load maintainer has relatively passed light control unit III but before said end of the hand has reached light unit II. This position of hand 17 is diagrammatically indicated in dotted lines at 38', Fig. 1. Switches 38, 39 and 40 are then substantially simultaneously closed with the result that current from a main line 41 is supplied through switch 38 to energize a transformer 42. The secondary circuit of this transformer supplies current to light sources 23, 28 and 31. Flow of light through light guide 30 will permit cell 32 to cause energization of the solenoid of switch 37 as from a battery 43. Contacts of switch 37 will thereupon open, thus preventing energization of the solenoid of switch 36 at the time of closure of switch 38. Hence the contacts of switch 36 will remain closed to permit the pump to continue operation. Light also flows through guide 27 to permit cell 29 to cause energization of a solenoid of a switch 44, the circuit therefor being from battery 43 through a wire 45, cell 29, a wire 46, solenoid of switch 44, and a wire 47 to the other side of battery 43. Simultaneously, flow of light through guide 20 upon cell 25 establishes a circuit from battery 43 through wire 45, cell 25 to a solenoid of a solenoid switch 48 and thence through wire 47 to the other side of the battery. Energization of the solenoids of switches 44 and 48 causes the same to open and close respectively. The energization of the foregoing solenoids merely places the control circuits in an initial operative condition. In order to establish the lower limit above which it is desired to maintain load on the specimen, the operator continues clockwise rotation of disc 18, Fig. 2. During this rotation, hand 17 will first intercept light through guide 27, thereby deenergizing solenoid of switch 44 and permitting its contacts to complete a circuit for a solenoid 51 as by wires 49 and 52. Energization of solenoid 51 causes closure of contacts 53 thereby establishing a circuit for solenoid 54, through a wire 56, to open by-pass valve 12. While opening of this valve will immediately cause a decrease of load, yet the amount of fluid by-passed is so small that the rate of decrease of load is sufficiently low as to permit continued rotation of disc 18 until it just intercepts the low limit light guide 20 and thereby immediately recloses the by-pass valve with consequent increase of load on the specimen. The foregoing reestablished circuit is as follows: When light guide 20 is just covered, cell 25 and the solenoid of switch 48 are deenergized to permit its contacts to open thereby deenergizing solenoid 51 and opening contacts 53. Solenoid 54 is thereby deenergized and valve 12 closed by gravity or by fluid pressure, and hence the pump increases the load on the specimen.

Figure 2:
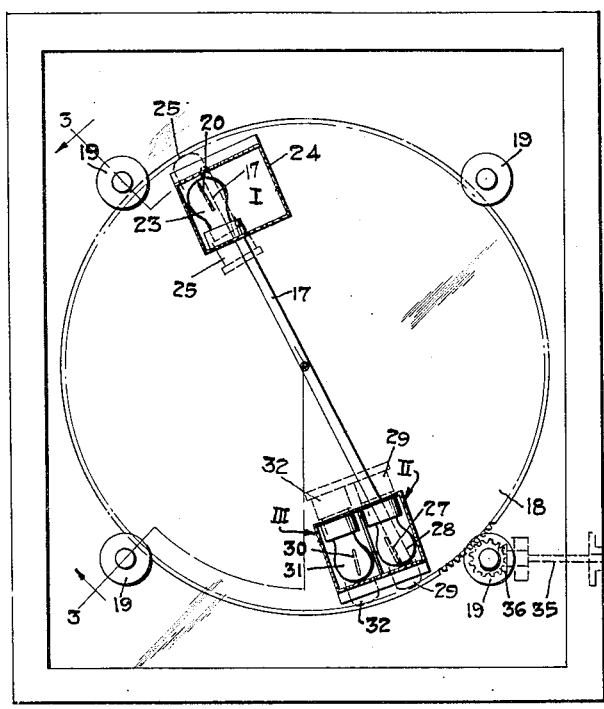
Fig. 2 is a front elevation of the apparatus for establishing the limits within which load may be maintained.

As the load increases on the specimen, hand 17 will move in a clockwise direction as viewed in Fig 2, this direction being diagrammatically indicated by arrow A in Fig. 1. The hand thus moves away from the light guide 20 and toward guide 27 with the result that the light beam through guide 20 energizes cell 25 to cause energization of the solenoid of switch 48, thereby reclosing its contacts but without establishing any circuit. As the load continues to increase on the specimen, hand 17 will ultimately intercept the beam of light through guide 27 and thus deenergizes cell 29 and the solenoid of switch 44. The contacts of switch 44 thereupon fall to their closed position and establish a circuit from one side of main line 41 through switch 39, solenoid 51, across contacts of solenoid switch 48 (which were closed when hand 17 uncovered guide 20), wires 49 and 52, across the closed contacts of solenoid switch 44 to the other side of the main line 41. Energization of solenoid 51 closes contacts 53 and also closes a contact 50. Thereupon solenoid 54 is energized to open by-pass valve 12. A portion of the pressure fluid from the pump is thus by-passed so that load on the specimen will decrease, if at all, but in any event will not increase. Any decrease in the application of load on the specimen will depend usually upon the leakage between the ram and cylinder and upon the adjustment of the pump or its discharge valve 10a. However, assuming that for anyone of various causes, the load on the specimen decreases, then load responsive hand 17 will move away from light guide 27 toward guide 20. When the beam of light thus energizes cell 29, the solenoid of switch 44 is reenergized to open its contacts. However, the by-pass valve 12 will continue to be held open due to the fact that contact 50 was closed upon energization of solenoid 51. The holding circuit for solenoid 51 is now through switch 39, solenoid 51, across contacts of solenoid switch 48, wire 49, contact 50 to contacts 53 and wire 56 to the other side of the supply line. Thus solenoid 54 is maintained energized so that by-pass valve 12 is in open position to permit the continued decrease in load on the specimen. Hand 17, moving in the direction of guide 20 as the load decreases, will again intercept the light therethrough so as to cause closure of the by-pass valve in the manner previously described. The cycle of control between the lower and upper limits 20 and 27 respectively is thereby established and this will be maintained within extremely close limits depending upon the distance light guides 20 and 27 are offset from a diametral line.

If for any reason the by-pass valve should not open when the light through the upper limit guide 27 is intercepted by hand 17, thus resulting in continued application of load, hand 17 will continue to move in response to the load in the direction of light guide 30. When the beam of light through said guide is intercepted by said hand, then cell 32 is deenergized to cause deenergization of the solenoid of switch 37 which thereupon falls to close its contacts. Upon closure of said contacts, the solenoid of switch 36 is then energized from the main line 41 through switch 38, thus causing the contacts of solenoid switch 36 to open and break the pump motor circuit to discontinue operation of the pump.

To indicate when the by-pass valve is open or closed, there is provided, Fig. 1, a pair of indicating lamps 60 and 61 whose circuits are controlled by solenoid 54 through contacts 62 movable with the solenoid core.

From the foregoing disclosure it is seen that the regulation of pressure or load or the application of power to a movable member is controlled automatically in accordance with the pressure or load and that this control is effected without imposing any friction or restraint whatsoever upon the load responsive means which specifically is the Bourdon tube 15 and hand 17. It is also seen that the power operated member in the form of the hydraulic ram is made to follow the load control responsive operations with a high degree of precision and with complete flexibility throughout the full load range of the apparatus regardless of other variable factors which may occur.

To change the pressure or load at any desired rate, the disc 18 may be rotated, at that rate through the shaft 35 and gearing 19 and 36.

It will of course be understood that various changes in details of construction and arrangement of parts may be made by those skilled in the art without departing from the spirit of the invention as set forth in the appended claims.

I claim:

1. In combination, means responsive to load on a specimen stressed in a materials testing machine, a power driven member, mechanism for controlling the application of power to said member, a plurality of photoelectric cells and light beam sources therefor whose beams are adapted to be alternatively intercepted by said load responsive means upon occurrence of predetermined loads, and means whereby said cells are adapted to control said mechanism within the limits of said predetermined loads.

2. In combination, a materials testing machine having hydraulic load producing means for stressing a specimen, means for controlling the application of power to said load producing means, high and low load limit devices for controlling said power application, and means responsive to the load on a specimen for controlling said high and low limit load devices thereby to maintain load on a specimen within the limits set by said devices.

3. The combination set forth in claim 2 further characterized by the provision of means for setting said devices to operate at any selected values substantially throughout the load range of the testing machine.

4. In combination, a materials testing machine having hydraulic load producing means, mechanism for controlling the application of hydraulic power to said means, a plurality of electric circuits one of which is adapted to cause an increase of application of power and the other a decrease of power, each of said circuits having a light beam source and a photoelectric cell of its own, and means responsive to the load on a specimen for controlling one or the other of the light beams whereby the control of one beam limits any increase of load on the specimen and control of the other beam causes an increase of load on the specimen, thereby causing the load on the specimen to be maintained within the limits set by said light sources.

5. The combination set forth in claim 4 further characterized by the provision of a safety circuit having a photoelectric cell and a light beam source therefor whose beam is adapted to be controlled to render the load producing means inoperative upon occurrence of a load in excess of a desired upper load limit.

6. A load control apparatus for a materials testing machine in which a specimen is stressed comprising, in combination, a plurality of photoelectric cells and light beam sources, means for rotatably supporting said cells and sources as a unit in fixed relative relation to each other, and a member freely movable between said cells and their light sources so as to intercept one or the other beams thereof automatically in accordance with load on the specimen, said intercepting member being movable about the axis of rotation of said unitary structure.

7. In combination, a materials testing machine having hydraulic load producing apparatus, a source of hydraulic power therefor, means whereby the load on a specimen may be brought up to a substantially predetermined value, a relief valve adapted to control the application of power to said load producing means, means for controlling said relief valve automatically in accordance with specimen load after the load has been initially brought up to a substantially predetermined value thereby to maintain said predetermined load on the specimen, said relief valve being maintained closed during initial load application on the specimen, and the control means for the relief valve having means whereby it is operative only after the initial load on the specimen has been brought up to substantially a predetermined value.

GEORGE E. TROXELL.